Patented July 19, 1927.

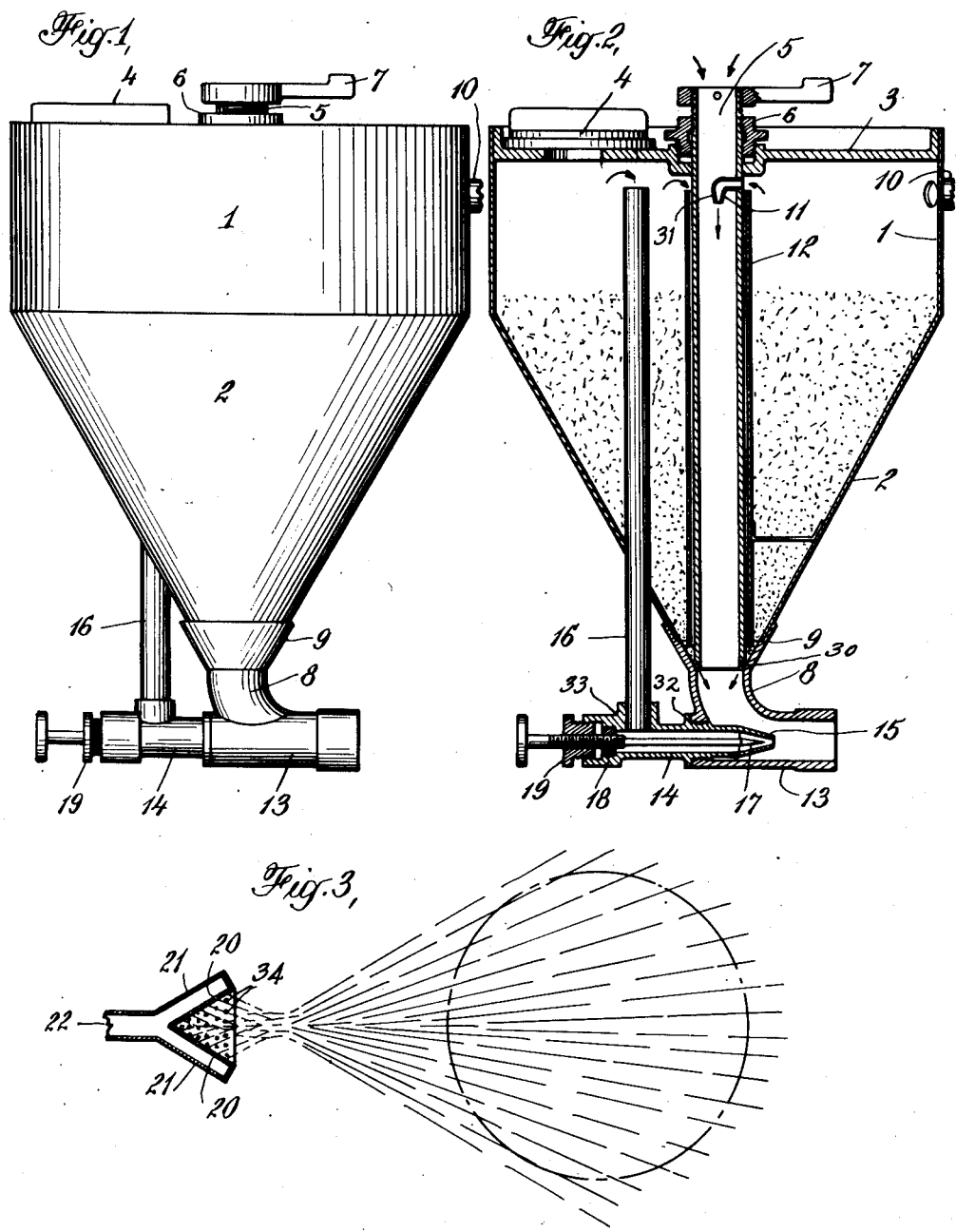

1,636,331

UNITED STATES PATENT OFFICE.

WILLIAM BLACKBURN SMITH, OF HAMILTON PARISH, BERMUDA, ASSIGNOR TO HERBERT HICE WHETZEL, OF ITHACA, NEW YORK.

APPARATUS FOR APPLICATION OF POWDERED DISINFECTANTS.

Application filed April 22, 1922. Serial No. 555,963.

My invention is an improvement in methods and apparatus for dusting growing plants with powder. In the application of powder to growing plants, for the destruction of the noxious insects or their eggs or larvæ whether to kill by direct action, or by poisoning through feeding on the plant, it is essential, in order to obtain the best results, that every treated portion of the plant be subjected to the uniform action of the powder. When the action of the powder is direct, it is essential that the atmosphere closely adjacent to the plant be permeated throughout every part thereof with the particles, and when the action is indirect, a deposit of the particles must be left on every treated portion of the foliage and plant. If the application is not uniform, the process will not be economical and the action of the insecticide will not be thorough. A part of the insects will be left to propagate and form new colonies. In devices of the character heretofore in use, the powder to be applied is held in a container, and is fed into a current of fluid under pressure, as for instance compressed air, by which it is blown upon the plant to be treated. Even with dry powder, the particles tend to mass and to adhere, and powder thrown in this manner is applied in lumps and patches, some parts of the plant being covered too thickly, while others are bare or insufficiently covered. With powders which act directly, the moving current is not uniformly permeated by the particles. Pockets occur which are devoid of particles, and the effect of the dusting is disappointing. It is relatively easy to apply a fluid, as for instance air under pressure, to every portion of the plant, and if the fluid is permeated throughout with particles of a powder in suspension, it will be obvious that wherever the current impinges on the plant, a deposit of the particles will be left, and the atmosphere immediately adjacent will be uniformly filled with the particles. In the present invention, I provide a device having means for feeding a stream of powder into successive currents of fluid under pressure, moving at different speeds, thereby to convert the stream of powder into a cloud or nebula, wherein all of the particles are as nearly as possible segregated, and the current of fluid under pressure, in which the particles are suspended is uniformly permeated throughout its extent with the particles.

In the drawings:

Figure 1 is a front view of the improved machine,

Figure 2 is a vertical section,

Figure 3 is a detail section of a form of distributing nozzle.

One of the principal objects of applicant's invention is to overcome the clogging of mechanical feeding devices and like auxiliary mechanisms produced by the sticking of the powder or dust to these mechanisms, such as the device disclosed and claimed in U. S. Patent No. 1,188,127.

In the present embodiment of the invention a suitable casing is provided, the said casing in the present instance comprising a substantially cylindrical portion 1, and a substantially conical portion 2, and the large end or base of the casing is closed by a head 3 having a suitable feed opening normally closed by a cover 4. A hollow shaft 5 is held at the axis of the casing, by means of a packing nut 6 with which the shaft has threaded engagement, and the shaft is provided with a handle 7, by means of which it may be turned, to adjust it for a purpose to be presently described. At the small end of the casing an elbow 8 is arranged. The elbow has at one end a funnel shaped portion 9 for receiving the small end of the casing, and the casing is secured thereto in any suitable or desired manner. The lower end of the shaft 5 is externally beveled, as shown in Figure 2, and this beveled end 30 cooperates with the flaring or funnel shaped portion 9 of the nozzle as a valve, to regulate the feed of the dusting powder, which is held in the casing, to the nozzle. By moving the shaft up or down, that is from and toward the nozzle, the rate of feed may be increased or diminished. The casing is provided with a pipe or nipple 10 above the level of the powder, which may be connected, by means of a flexible hose or the like, to a suitable source of supply for fluid under pressure, either a reservoir or compressor. The outer end of the hollow shaft is open to the atmosphere, and an elbow 11 transmits the pressure in the casing 1—2, to the interior of the hollow shaft 5. The delivery end of the nozzle is at the axis of the shaft, and the nozzle discharges toward the elbow 8. In use the casing is filled with powder to about the junction between the cylindrical and tapering portions, and a sleeve or shell 12 encircles the shaft in spaced relation, and extends from just above the lower end of the hollow shaft to well above the level of the top of the powder in the casing. This sleeve or shell transmits the pressure in the casing above the powder to just above the point where the powder feeds from the casing to the nozzle, and the pressure transmitted through the sleeve feeds the powder into the elbow, which constitutes a feed and transforming chamber.

The elbow 8, which is a discharge nozzle for the cloud, has a nipple 13, whose axis is coincident with the discharge end of the elbow, and a valve casing 14 has threaded engagement with the nozzle. This casing has a tapering discharge or outlet end 15 within the elbow, and at the axis thereof, and the valve casing has a lateral nipple 33 with which is connected a pipe 16. This pipe 16 extends through an opening in the tapering portion of the casing 1, 2, to a point above the level of the powder, that is to a point adjacent to the nozzle 11, so that the pressure in the casing is transmitted through the valve casing 14 to the discharge end of the elbow. A needle valve 17 is arranged within the valve casing, the valve having threaded engagement with a nut 18 held in the casing, and a packing nut 19 is arranged outside the nut 18. By turning the valve in the proper direction, the discharge of fluid under pressure through the valve casing may be varied. The improved dusting machine might be transported in any suitable manner, as for instance it may be provided with a handle for carrying the same, and may be connected by a long hose to a source of fluid under pressure to permit the operator to move from plant to plant without moving the source. Or it might be mounted on a carriage with the source of fluid under pressure supply. The machine operates in the following manner. Through the annular opening between the hollow shaft 5 and the element 9, an annular stream of powder mixed or impregnated with compressed gas, feeds. The feed is made uniform among other means by the pressure on the top of the powder mass, and when the stream passes below the lower end of the sleeve 12, it is subjected to the action of a current of small volume moving at a relatively high speed. As the stream feeds on beyond the end of the shaft 5, the powder already mixed with the air current through the sleeve or shell 12 is subjected to the action of a second stream of large volume and lower pressure, moving at a relatively slow speed. The powder and admixed air, already fairly agitated is transformed into a cloud, the individual particles of the powder being as nearly as possible segregated from each other, and being carried in suspension on the moving air current which is delivered through the outlet end of the elbow. Every part of this air current is permeated with the powder particles, the current being in effect a nebula or cloud of powder particles. It will be obvious that when the stream of fluid under pressure laden with the powder particles is directed onto the plant, every part thereof will receive a deposit of the powder, and the atmosphere immediately adjacent to the plant will be filled and permeated with the powder particles, so that no part of the plant escapes the action of the powder. Any suitable director for the stream may be provided, or it may be directed directly from the discharge end of the elbow 8. In Figure 3 a preferable form of directing nozzle is shown. This nozzle is of conical shape, consisting of inner and outer concentric conical walls 20 and 21, arranged in spaced relation and connected at the large ends of the walls. The outer wall 21 has a nipple 22, which may be connected with the discharge end of the elbow, and the inner wall 20 is provided with openings 34 as shown, through which the powder cloud is discharged. With this nozzle a cone shaped cloud may be discharged upon the plant.

It will be evident from the description that the powder is fed from the casing to the feed chamber 8 by a current of gas under pressure, of relatively small volume and high velocity, namely the annular stream through the shell, and that in the feed chamber it is subjected to the action of a stream of gas of relatively large volume and low velocity and relatively lower pressure, namely that through the hollow shaft. These streams cooperate to break up the aggregation of particles of powder, and to transform the particles into a cloud which is discharged by the ejector 15. The ejector provides a current of relatively small volume and high velocity. Throughout its passage from the container to the plant, the powder is subjected to the action of gas currents of different volume and different velocity and of different pressure, thereby to thoroughly break up particle aggregations to form a cloud or nebula. The current moving through the hollow shaft is large in volume and relatively low in pressure, because the shaft is open to the atmosphere at its inlet end, but the velocity is low, lower than the velocity of the currents through the shell or through the ejector.

I claim:

1. A device of the character specified comprising a casing having a feed chamber, and an ejector for discharging the powder from the feed chamber, means for feeding the powder in a regulated stream from the container to the feed chamber, and means for directing a current of fluid under pressure of relatively large volume and low velocity upon the stream as it leaves the container, to break up aggregations of particles and transform the powder into a cloud prior to its discharge by the ejector.

2. A device of the character specified, comprising a closed casing having a feed chamber to which the casing delivers, means for feeding a regulated stream of powder from the casing to the feed chamber and controlled by a current of fluid under pressure of relatively small volume and high velocity, means for subjecting the powder as it is fed into the chamber to the action of a current of fluid under pressure of relatively large volume and low velocity, thereby to break up aggregations of particles and to transform the powder into a cloud, and an ejector for discharging the powder from the feed chamber.

3. A device of the character specified, comprising a closed casing having a hopper outlet, and a feed chamber to which the outlet delivers, means for supplying fluid under pressure to the casing above the powder, a hollow shaft cooperating at its inner end with the hopper outlet to control the feed of the powder to the chamber, the outer end of the shaft being open to the atmosphere, a nozzle connecting the shaft with the interior of the casing for directing a stream of fluid under pressure toward the outlet, a shell encircling the sleeve in spaced relation and extending from above the powder to near the lower end of the sleeve to direct an annular stream of fluid under pressure onto the powder feeding into the feed chamber, and an ejector connected with the interior of the casing above the powder for discharging the powder from the feed chamber.

4. A device of the character specified, comprising a casing for holding powdered material, a feed chamber to which the casing delivers, an ejector for discharging the powder from the feed chamber, means for feeding the powder in a regulated stream from the container to the feed chamber including means for introducing a current of gas under pressure into the casing above the surface of the powdered material to force the powdered material into the feed chamber, and means for directing a current of fluid under pressure of relatively large volume and low velocity upon the stream as it leaves the container, to break up aggregations of particles and transform the powder into a cloud prior to its discharge by the ejector.

5. A device of the character specified, comprising a closed casing having a feed chamber to which the casing delivers, means for feeding a regulated stream of powder from the casing to the feed chamber and controlled by a current of fluid under pressure, of relatively small volume and high velocity, means for subjecting the powder as it is fed into the chamber to the action of a current of fluid of relatively large volume and low velocity, thereby to break up aggregation of particles and to transform the powder into a cloud, and an ejector for discharging the powder from the feed chamber.

In testimony whereof I affix my signature.

WILLIAM BLACKBURN SMITH.